United States Patent [19]

Schwartzman

[11] 4,303,377
[45] Dec. 1, 1981

[54] TURBINE-COMPRESSOR EJECTOR

[76] Inventor: Everett H. Schwartzman, 2751 Toledo St., Torrance, Calif. 90503

[21] Appl. No.: 102,129

[22] Filed: Dec. 10, 1979

Related U.S. Application Data

[63] Continuation of Ser. No. 875,115, Feb. 3, 1978, abandoned.

[51] Int. Cl.$^3$ .................. F04B 17/00; F04B 35/00
[52] U.S. Cl. .................. 417/406; 60/39.52; 417/408
[58] Field of Search .................. 417/405–409, 417/355; 60/39.52

[56] References Cited

U.S. PATENT DOCUMENTS

| | | | |
|---|---|---|---|
| 1,610,454 | 12/1926 | Lawaczeck | 417/406 UX |
| 2,709,893 | 6/1955 | Birmann | 417/405 UX |
| 2,717,118 | 9/1955 | Walter | 417/408 X |
| 3,784,324 | 1/1974 | Staveren | 417/406 X |

FOREIGN PATENT DOCUMENTS

| | | | |
|---|---|---|---|
| 701509 | 1/1941 | Fed. Rep. of Germany | 417/407 |
| 466729 | 3/1914 | France | 417/406 |
| 663168 | 12/1951 | United Kingdom | 60/598 |

Primary Examiner—Michael Koczo, Jr.
Attorney, Agent, or Firm—Smyth, Pavitt, Siegemund & Martella

[57] ABSTRACT

A unique and improved turbomachine for increasing the pressure of one fluid stream by an energy exchange with that of another fluid stream, at relatively high efficiency, includes a housing supporting a compressor turbine wheel for rotation on bearings. Low pressure fluid enters the compressor, driven at the same rpm and by the turbine, such that the tangential velocity of the fluid leaving the compressor is increased. A high pressure fluid enters the housing through an ejector nozzle and is expanded and mixed with the fluid leaving the compressor, the mixed fluid flowing through the turbine. Since a greater amount of fluid flows through the turbine than through the compressor, there is a sufficient amount of energy to drive the compressor and to provide an output from the turbine which is at a pressure higher than that of the fluid entering the compressor. Various forms and systems are described.

23 Claims, 13 Drawing Figures

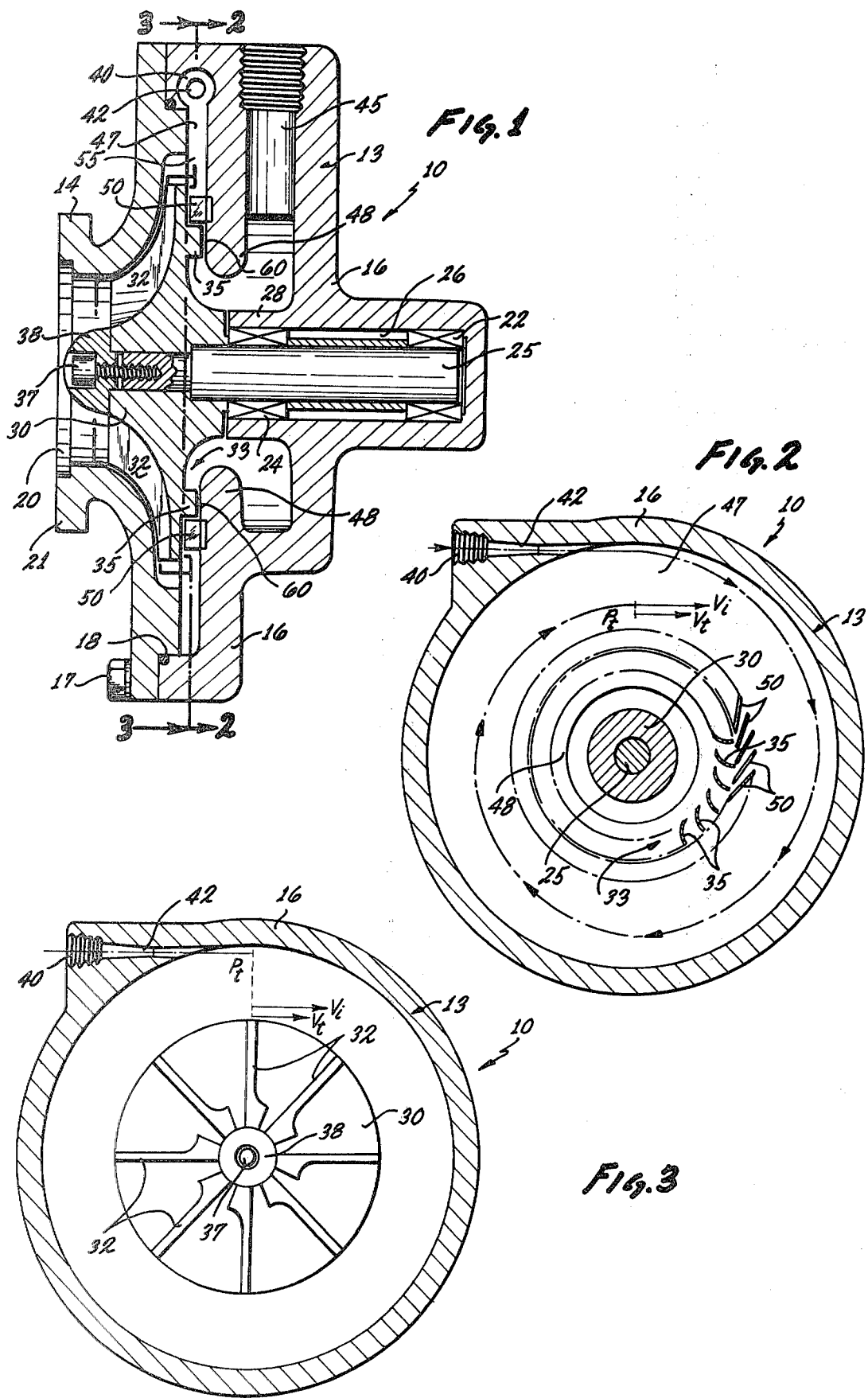

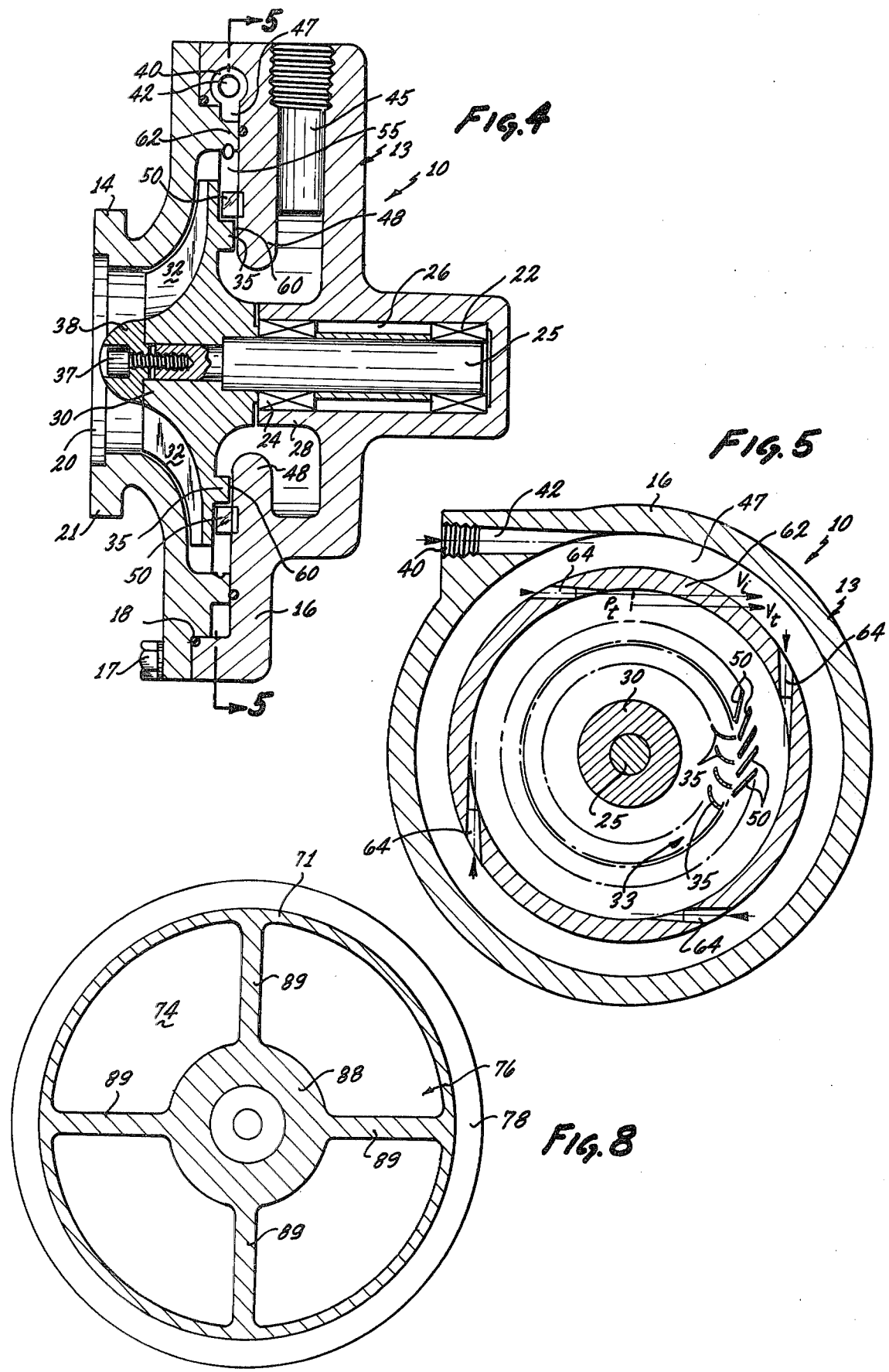

TURBINE-COMPRESSOR EJECTOR

This is a continuation of application Ser. No. 875,115 filed Feb. 3, 1978, now abandoned.

BACKGROUND OF THE INVENTION

This invention relates to turbomachinery and more particularly to an improved type of turbomachinery which is a unique turbine-compressor-ejector device having unique structural features and performance and which is capable of use in a wide variety of various and diverse cycles.

It is known in the art to use turbines and compressors or turbine-compressor combinations in various cycles, see for example my earlier issued U.S. Pat. Nos. 3,570,261; 3,805,540; 3,869,351; and 4,023,946 and my copending United States application Ser. No. 606,790, filed Aug. 22, 1975.

As is known in the art, a turbine is a device which uses fluid at a relatively high pressure and usually at a relatively high temperature to convert energy to work. The output of the turbine is fluid at a lower pressure and which is cooler than the input. The difference in temperature is directly related to the work output and may be expressed in terms of the temperature difference times the specific heat and mass flow of the fluid, the product representing the power output.

In the case of a compressor, the input is a fluid at a relatively low pressure and usually at a relatively low temperature. The output is at a pressure and temperature higher than the input and the amount of work required again is related to the difference in temperature and may be expressed in terms of the temperature difference times the specific heat and the mass flow, the product representing the power input.

Also known in the art is a device called an ejector, in which a high pressure source fluid is used to pump low energy low pressure fluid. In the process of operation, the pressure of the high pressure source fluid is decreased and the pressure of the low pressure fluid is increased to exit pressure. In most instances an ejector is inefficient although if the low pressure fluid is at an extremely high temperature it may be possible to obtain a uniform velocity immediately in front of the ejector tube and this may be a high efficiency system.

In the case of turbomachinery, e.g. turbines, compressors, and turbocompressor combination, the efficiency of small equipment, i.e. equipment operating at relatively low Reynold's Numbers for a turbine is about 50% while that of a compressor is in the range of 35% to 42%. As is well known in turbomachinery, the Reynold's Number is equal to the tip speed of the machine times the diameter of the wheel divided by kinematic viscosity of the fluid. Thus, in systems employing relatively low Reynold's Number turbine-compressor combinations, the overall system efficiency is in the range of 17.0% to 21%.

In a compressor-turbine combination, there are disc friction losses due to the shearing action between the wall and the rotating part. These friction losses occur at four places, the front and back of each wheel of the compressor and turbine. Moreover, a compressor usually has a diffuser, used to convert kinetic energy to potential energy by slowing the velocity of the fluid leaving the wheel. In effect, the fluid leaving the wheel is at a high tangential velocity and the diffuser functions to convert the high velocity to high pressure at relatively low velocity. Thus, the presence of a diffuser represents one of the major single losses in overall efficiency in a compressor.

SUMMARY OF THE INVENTION

The present invention relates to turbomachinery and more particularly to an improved device which is a novel turbine-compressor-ejector machine having unique structural features and enhanced performance compared to turbo-compressors or ejectors.

The basic components of the turbine-compressor-ejector (TCE) device of the present invention are a housing which supports a bearing mounted shaft on which a turbine compressor wheel is mounted. The compressor side of the wheel communicates with a low pressure fluid inlet in the housing. On the rear of the turbine compressor wheel is a plurality of turbine blades mounted for rotation with the compressor side of the wheel since the turbine compressor wheel rotates as a unit.

The housing also includes a drive fluid inlet nozzle which communicates with a mixing region where incoming drive fluid at a relatively high velocity is mixed after expansion through the nozzle with the low pressure fluid coming through the low pressure fluid inlet and passing in contact with the compressor side of the wheel. The combined stream then passes through optional guide vanes and through the turbine blades on the rear of the wheel and is discharged through an outlet in the housing.

Thus, the TCE device of this invention is based on the theoretical concept that if two streams having the same velocity and static pressure are mixed, there is very little energy loss (conservation of momentum). Accordingly, the TCE device of this invention represents an efficient machine for increasing the pressure of one fluid stream by an energy exchange with that of another fluid stream in which the pressure level of the first stream is increased while the pressure or energy level of the second stream is decreased.

One striking feature of the TCE device of this invention is the efficiency as compared to turbo-compressor devices and ejectors. For example, in the TCE, disc friction is about one fourth that of the turbine compressor. This is accomplished in the TCE by effectively eliminating the back of each of the compressor and turbine and by a reduction of a substantial portion of the turbine blades. Moreover, there is no diffuser in a TCE in accordance with this invention. Further, there is a substantial reduction in "leakage" as in the case with turbines.

By way of explanation, there is clearance between the turbine blade and the wall which is fixed by machining tolerances usually 0.002 to 0.003 of an inch. The passage of high pressure fluid through this clearance represents leakage and does little useful work, i.e. some percentage of the high pressure fluid input in a turbine is lost as leakage. In small turbines used in small power systems, the leakage loss can represent a substantial loss because of the narrow blade arrangement and the percentage of leakage between the blade and wall is substantial compared to the total flow through the turbine.

In the TCE device of the present invention, there is a substantial reduction in leakage of the high pressure input fluid because even though the amount of leakage is the same, the amount of high pressure source fluid leakage is reduced by the increased mass flow due to flow attributable to the low pressure source fluid. The TCE device of this invention is, for small power units, far more efficient than turbine-compressor units. It is understood, however, that the TCE of this invention may be used in large power systems.

The other advantages of the TCE device of the present invention are that there are fewer moving parts, principally one, the turbine compressor wheel. Compared to turbine-compressor combinations, only half of the moving parts are present in a TCE and the turbine blades are mounted on the back of the compressor but need not be integral therewith.

The TCE of this invention is also more efficient than an ejector even though the latter has no moving parts. Although a turbine-compressor is more efficient than an ejector, the former is somewhat complicated and less efficient than the latter when the energy and flow levels of the given streams are such as not to allow a good turbine and compressor match with respect to flow and speed.

The TCE device of the present invention may be in the form of either of the well-known geometric devices in the field of rotating machinery, e.g. centrifugal, axial flow, or mixed flow devices.

As a general rule, with respect to the TCE device of this invention, the diameter of the compressor and turbine, the pressures of the high pressure source and low pressure source, and the speed of the blade and the temperature of the source fluids are all related to obtain maximum efficiency i.e. the tangential velocity of the fluid approaching the turbine blade and the tip speed of the turbine blade are optimum for turbine blade design, configuration, and dimension. For example, for impulse type turbine blades, the velocity of the approaching fluid should be twice that of the turbine tip speed. In the case of reaction type turbine blades, the velocity relative to the blade tip speed should be in the range of 1 to 2.2 and preferably about 1.45.

The TCE device of this invention may be used in most installations where a turbine drives a compressor, especially if the driving and pumped fluids can be mixed. The device of this invention may also be used in gas turbines; jet engines; pumps of the shallow well, deep well, or explosion proof type; vacuum pumps and vacuum cleaners; in refrigeration, freezing and air conditioning systems; in heat pumps; solar and geothermal and waste heat power systems; desalinization systems; in ejector applications; turbochargers; compressor stations; and in the chemical processing industry.

It will be apparent that other advantages, modes and uses will be readily understood by those skilled in the art after they have read the detailed description and referred to the accompanying drawings which illustrate what are considered to be preferred embodiments of the best mode contemplated for utilizing the novel and improved structure and method set forth in the appended claims.

BRIEF DESCRIPTION OF THE DRAWINGS

FIG. 1 is a view partly in section and partly in elevation of a centrifugal design of a TCE device in accordance with the present invention having a single drive fluid inlet nozzle and an expansion region;

FIG. 2 is a sectional view taken along the line 2—2 of FIG. 1;

FIG. 3 is a view in section taken along the line 3—3 of FIG. 1 showing the compressor side of the wheel;

FIG. 4 is a view similar to FIG. 1 of a TCE device in accordance with the present invention having multiple drive fluid nozzles;

FIG. 5 is a view in section taken along the line 5—5 of FIG. 4;

FIG. 8 is a view in section taken along the line 8—8 of FIG. 6;

DETAILED DESCRIPTION

Figure 6:
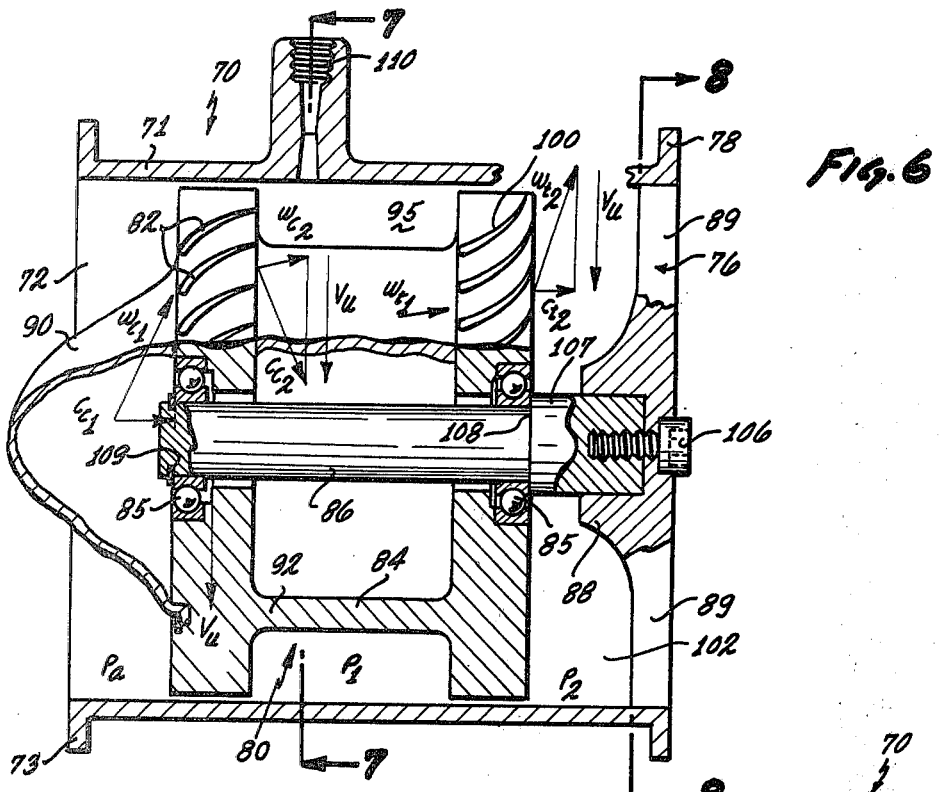
FIG. 6 is a view partly in section and partly in elevation of an axial flow design of a TCE device in accordance with the present invention.

Referring to FIGS. 1-3 of the drawings which are merely illustrative of one form of the present invention, a turbine-compressor-ejector device 10 is shown including a housing 13 composed of a front housing 14 secured to a rear housing 16 by bolts 17 (one being shown), the two housings being sealed by an O-ring 18.

The front housing 14 includes a low pressure fluid inlet opening 20 and a flange 21 for mounting a conduit supplying low pressure fluid. It is understood that a screwed end may be used rather than a flange coupling.

Supported in the rear housing 16 by bearings 22 and 24 is a shaft 25 which rotates relative to the housing, the shaft being mounted in a rear chamber 26 whose forward end 28 is formed as an annular extension. Mounted on the shaft is a turbocompressor wheel 30 including a compressor wheel 32, the rear face of which includes a turbine 33 composed of a plurality of blades 35, either integrally formed with the wheel as shown or which may be separate. As shown, the turbine compressor wheel 30 is splined to the shaft 25 and secured by bolt 37 through an aerodynamic nose 38.

The rear housing also includes an ejector inlet opening 40 forming an inlet for the drive fluid, the ejector opening cooperating with an inlet nozzle 42 also formed in the housing. The rear housing also includes an outlet 45 for the pumped fluid.

Fluid leaving the inlet nozzle 42 enters an annular fluid expansion chamber 47 forward in the rear housing and to the rear of the compressor and in radial alignment with the turbine blades 35. Supported by an annular shoulder 48 which forms the rear face of the expansion chamber 47 are a plurality of guide vanes 50 which are mounted and secured to the shoulder 48 to direct flow into the turbine blades 35 which are radially inward of the guide vanes. The expansion region 47 is radially outwardly of a mixing region 55, the latter an annulus in line with the expansion region and forming a band-like zone to the rear of the tips of the compressor blades.

The thermodynamic basis upon which the TCE device of this invention operates is the fact that if two streams are mixed and each stream has an equal velocity, the efficiency of such mixing (conservation of momentum) can approach 100%. Thus, because there are no mixing losses in the TCE device of this invention, a highly efficient device is provided. This is accomplished by the compressor wheel 30 which accelerates the flow of the incoming low pressure fluid so that the velocity of the compressed fluid is approximately equal to the velocity of the working fluid expansion as it exits from the ejector nozzle. For a radial wheel design, the desired output pressure is obtained by the centrifugal field created by the rotation of the wheel, and all of the tangential velocity of the wheel is subsequently used to power the device. Three types of rotating machinery may be used, the centrifugal, axial flow, and mixed flow.

As the rotational speed of the compressor wheel is increased, by the high pressure fluid acting on the turbine wheel 33, there are two effects: (1) there is an increase in the static pressure (Pt) at the exit of the wheel due to the centrifugal field set up by the rotation (as seen in FIG. 2); and (2) the tangential velocity (Vt) of the fluid leaving the wheel increases as a direct function of the rotational speed.

The high pressure incoming fluid, which acts as a drive fluid, is expanded through the nozzle 42 as shown in FIG. 2 so that its existing velocity corresponds to the expansion occuring between Po and Pt, i.e. the total pressure of the inlet fluid and the static pressure at a given point due to the centrifugal field created by the rotating compressor wheel, respectively.

At a particular wheel speed, the inlet velocity, (jet velocity) Vj, is approximately equal to the tangential velocity Vt of the fluid leaving the wheel. This is because as the wheel speed increases, the pressure due to the centrifugal field also increases with the result that the expansion pressure ratio (Po/Pt) is reduced thereby the corresponding jet velocity is also decreased. Thus, a condition is reached at which point the jet velocity (Vj) is equal to the velocity (Vt) of the tangential fluid. At this point there will be a minimum of losses when the two fluids (incoming jet and wheel through flow) are combined. As a practical matter, Vt/Vj will be slightly less than one at optimum design.

After both streams are mixed, they will have the same tangential velocity at the given pressure (Pt). This combined stream then passes through the guide vanes 50, which are optional, and then through the turbine blades on the back side of the compressor wheel. The work obtained is due to the reduction of the entering tangential velocity (Vt) to zero by the turbine blades on the rotating wheel. The reduction of the entering tangential velocity may be obtained by either a full-impulse type turbine or a partial-reaction type turbine, in which event some pressure decrease occurs as the fluid flows through the turbine. The type of expansion device (the turbine or blading thereof is well known in the art and depends upon the overall system requirements and considerations.

From a thermodynamic approach, the work extracted by the turbine blades has to equal the work required by the compressor wheel. However, the available output work through the turbine is ample to satisfy that required by the compressor since the mass flow through the turbine is greater by the proportional amount of the added drive fluid. Thus, in any given design of the device in accordance with this invention the output of work manifests itself in the higher pressure level leaving the device through outlet 45 as compared to the inlet pressure of the fluid entering inlet 20 of the compressor.

The greater efficiency of the device of the present invention as compared to turbines, compressors, turbine-compressors, or ejectors occurs because the device of this invention has no diffusion loss since there is no diffuser, and because all the flow, both through the compressor, i.e. the low pressure incoming fluid, and the fluid in the ejector, i.e. the drive fluid, pass through the turbine blades. Accordingly, the width of the turbine blades of a device in accordance with this invention are much wider than those of a conventional turbine and, in many cases, as much as by a factor of 5 to 10 times. In this way the percentage of leakage of the high pressure source fluid between the turbine blades and the opposed housing wall, that is the clearance space 60 formed by the space between the shoulder 48 and the facing ends of blades 35 is correspondingly much smaller even though the total amount of leakage is the same as in a conventional turbine. The reason is that the amount of leakage of high pressure source fluid is reduced by the increased mas flow due to flow from the incoming low pressure fluid. In effect, the absolute percentage of total leakage past the blades is essentially the same in the present device and prior art turbines, but the percentage of leakage of high pressure source fluid, the element which is important for turbine efficiency, is substantially reduced due to the flow of low pressure incoming fluid passing through the same clearance space 60.

It is well known that the clearance space between the turbine blades and the opposed wall is controlled by a tolerance which is a manufacturing tolerance, and is usually about 0.002 for small turbines. If the blade is many times wider (as measured in an axial direction), as with the present invention, in order to accommodate greater flow, then the leakage losses will be proportionately less thus providing a higher efficiency. Also, the associated and inefficient process common to low specific speed turbine, i.e., "partial admission" is also eliminated with the novel device of this invention.

More specifically, with narrow width blades which are typical of systems of the small power class of the prior art, the percentage of leakage through the clearance between the blade end and the facing wall is substantial compared to the total flow through the device since the only fluid, the power fluid, flowing through the clearance is that entering the turbine. By this invention, where the clearance space is the same, the percentage of power fluid passing through the clearance is reduced, and the leakage loss of power fluid is correspondingly reduced, to provide increased and important efficiency.

Thus, by the present invention, the diameter of the turbine and compressor and the pressure of the high pressure source fluid, low pressure source fluid and the speed and temperature are all related to obtain an efficient device, i.e. the tangential velocity of the fluid approaching the turbine blades and the tip speed of the turbine blades are optimum for the turbine blade design, configuration and dimension. In the case of impulse type blades, the velocity of the approaching fluid should be twice that of the turbine tip speed, while for reactor type blades, the velocity of the approaching fluid may be in the range of 1 to 2.2 and preferably 1.45.

One of the other factors of increased efficiency of the device of the present invention is that disc friction losses are reduced to about 25% of that present in a turbine compressor combination by elimination of the back of each of the compressor wall and turbine-wall interfaces by mounting the compressor and turbine in a back-to-back relation, thus eliminating the loss in efficiency due to shear at those interfaces between a rotating and stationary part. Also, a substantial portion of the turbine blades are reduced over the turbine blades used in conventional compressor-turbine combinations.

The elimination of a diffuser in a compressor also assists in increasing the efficiency since the diffuser or stator converts kinetic energy to potential energy, i.e. a diffuser slows down the velocity of fluid leaving the compressor wheel of a typical compressor, with the result that high tangential velocity is converted to high pressure at relatively low velocity. In contrast, the present invention largely relies upon the high tangential velocity of the fluid leaving the compressor stage 30 to be equal in velocity to the fluid with which it is mixed, i.e. the drive fluid, with a resultant efficiency of mixing which approaches 100%. The resultant fluid is then utilized to drive the turbine without the requirement of reducing the resulting velocity with the normal type of diffuser arrangement.

The device shown in FIGS. 4 and 5 is basically the same as the device illustrated in FIGS. 1–3 except that an inlet nozzle ring 62 is positioned in the expansion chamber 47 such that drive fluid entering the ejector inlet opening 40 flows through a plurality of nozzles 64 provided in a ring 62 secured between the housings 14 and 16. The ring 62 may be aligned with pins or other locators and sealed between the housings such that fluid entering the inlet 40 flows through the nozzles 64 through the stationary guide vanes 50 which form the inlet for the turbine blades 35. The operation of the device otherwise is as described in FIGS. 1–3.

Figure 7:
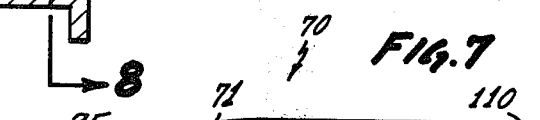
FIG. 7 is a view in section taken along the line 7—7 of FIG. 6.

Another form of the device of the present invention is shown in FIGS. 6–8 in which an axial device 70 is illustrated including a housing 71 having an inlet 72 with a mounting flange 73 thereon, although a screw type mounting may be used, if desired. The housing also includes an outlet 74 (FIG. 8) formed by an end closure member 76 sealed to the housing 71 whose end is provided with another flange 78 for mounting, although a screwed end may be used. Closure member 76 is in the form of a spider used to support an axial turbine-compressor generally indicated 80 as will be described.

The turbine-compressor 80 includes axial compressor blades 82 mounted on a rotatable turbine compressor spindle 84 supported by bearings 85 in a stationary shaft 86 extending from the spider 76 which includes a central hub 88 from which legs 89 extend, the spaces between the legs being upon areas for outlet flow.

The compressor-turbine spindle 84 is in the form of an annular member the forward end of which includes the axially disposed compressor blades 82 which extend radially from the spindle but which are oriented axially with respect to fluid flow entering the inlet 72. Mounted on the front end of the spindle is a cone 90 such that flow is directed into the compressor blades 82. The hub 92 of the compressor-turbine spindle is of reduced diameter with respect to the blades 82 which extend outwardly therefrom, the hub 92 being spaced from the housing 71 to form a chamber 95, as shown.

The chamber 95 which acts as an expansion chamber for fluid entering the inlet is in the form of an annulus located to the rear or discharge side of the compressor blades 82 and forward of turbine blades 100, also axially arranged with respect to the fluid flow and also provided on the hub 92. Fluid leaving the turbine blades 100 enters a discharge area 102 provided between the spider 76 and the outlet 74.

The shaft 86 is fixed to the hub 88 of the spider by a bolt 106 or other suitable mounting arrangement, the end 107 of the shaft including a shoulder 108 to support the adjacent bearing 85, while the forward bearing is retained by ring 109 or other suitable means. Located in the housing 71 and positioned for fluid communication with the chamber 95 is a high pressure fluid inlet 110 such that high pressure fluid entering the inlet 110 expands in the chamber 95.

Thus, low pressure fluid enters the inlet 72 and enters the compressor wheel portion 82 of the compressor-turbine. The absolute velocity vector of the flow to the compressor is shown by $CC_1$ while the relative velocity vector of the fluid entering the compressor is shown by $WC_1$. The relative velocity vector of the fluid leaving the compressor is shown as $WC_2$ and the absolute velocity vector is shown as $CC_2$. The tangential velocity vector of the wheel (i.e. hub) is shown as $Vu$. Thus the low pressure fluid entering at inlet 72 is increased in velocity and pressure so as to approach the velocity and static pressure of the drive fluid entering through inlet 110 into chamber 95. Thus, the fluid entering the turbine 100 has a relative velocity vector shown as $Wt_1$, the relative velocity vector of the exiting fluid being shown as $Wt_2$ having an absolute velocity vector shown as $Ct_2$ and a tangential velocity of $Vu$. Again as described in connection with FIGS. 1–3, the incoming pressure Pa is less than that of the chamber P1 which in turn is less than that of P2, the discharge pressure. The effect again is to increase the pressure of a low pressure, incoming fluid by the use of a higher pressure drive fluid entering inlet 110 which functions as an ejector to introduce fluid to chamber 95 acting as a mixing region for the incoming high pressure fluid from 110 and the outlet of the compressor 82. The incoming high pressure fluid expands and is mixed with the output of the compressor for combined flow through the axial turbine. Thus there is an energy exchange between the low pressure incoming fluid with the high pressure fluid, with all of the advantages described in connection with the foregoing described embodiments.

Figure 9:
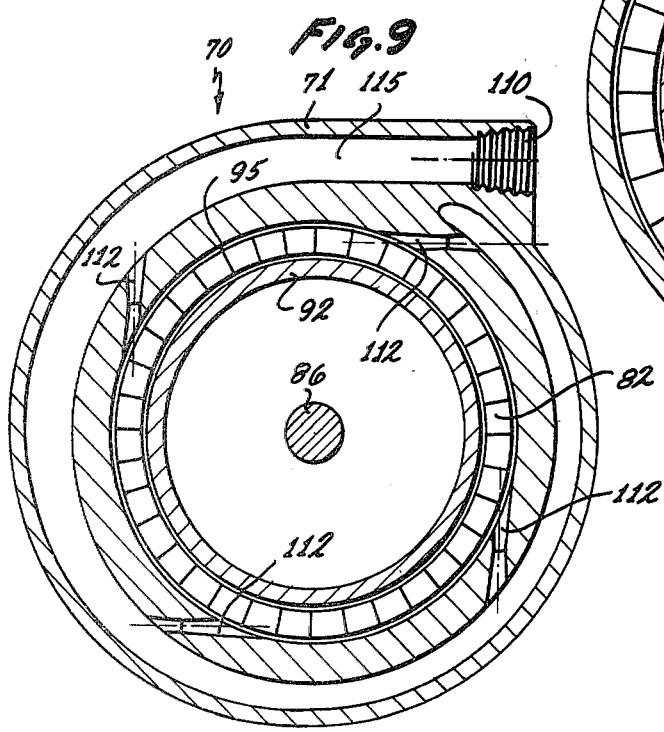
FIG. 9 is a view in section, similar to FIG. 7 showing a TCE device of axial flow design having multiple inlet nozzles.

The device shown in FIG. 9 is similar to that of FIGS. 6–8 except that a plurality of inlet nozzles 112 are used to direct flow into the turbine blades, the outer housing being provided with an annular inlet chamber 115 located radially outwardly of the compressor blades 82, as shown.

In the device of FIGS. 6–9 as well as that of FIGS. 1–5, the turbine wheel supplies the power to drive the compressor wheel mounted to rotate at the same rpm as the turbine wheel. The turbine wheel supplies the power to drive the compressor wheel by the momentum exchange due to the tangential velocity of the total fluid entering the drive turbine. Since the total amount of fluid flowing through the turbine wheel is greater than the flow through the compressor, a sufficient amount of energy is available to drive not only the compressor but to enable the stream leaving the turbine to have a higher pressure than that entering the compressor. In each case, the efficiency is obtained by having the velocity and pressures of the two streams at about the same magnitude so as to reduce any mixing losses.

Accordingly, the system of this invention may be used in the design of efficient jet engines and turbines.

Figure 10:
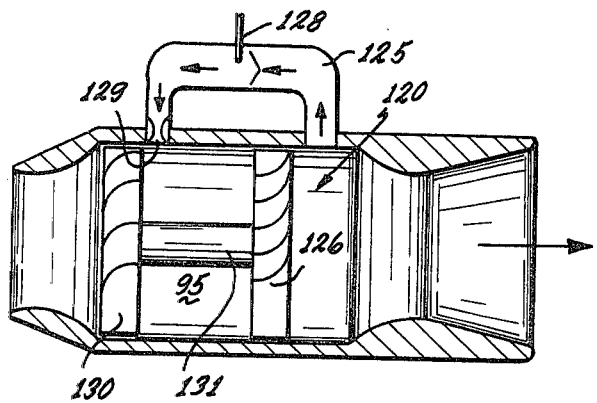
FIG. 10 is a diagrammatic view of a jet engine using the TCE device of this invention.

Referring to FIG. 10, a jet engine is shown in schematic form including the TCE device 120 of this invention. Here, the drive fluid entering the chamber 95 is provided by an external energy source such as a burner or heat adding device 125 which receives a portion of the output of the turbine 126 and to which fuel is added at 128 for flow through an inlet 129 into the chamber 95 at a higher energy level than the fluid flowing in and through the compressor 130 mounted for rotation with the turbine as indicated by shaft 131.

Figure 11:
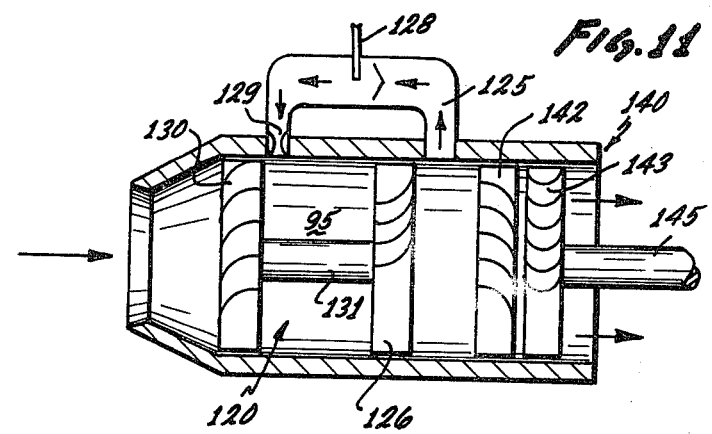
FIG. 11 is a diagrammatic view of a simple gas turbine using the TCE device of this invention.

In still another form, which is a variant of what is illustrated in FIG. 10, a gas turbine using a TCE device may be used in a free shaft turbine power output device 140 as shown in FIG. 11. There, the exiting fluid passes through a power turbine stator 142 which drives a power turbine 143 having a power output shaft 145 mounted thereto. Power is extracted from the shaft 145.

Figure 12:
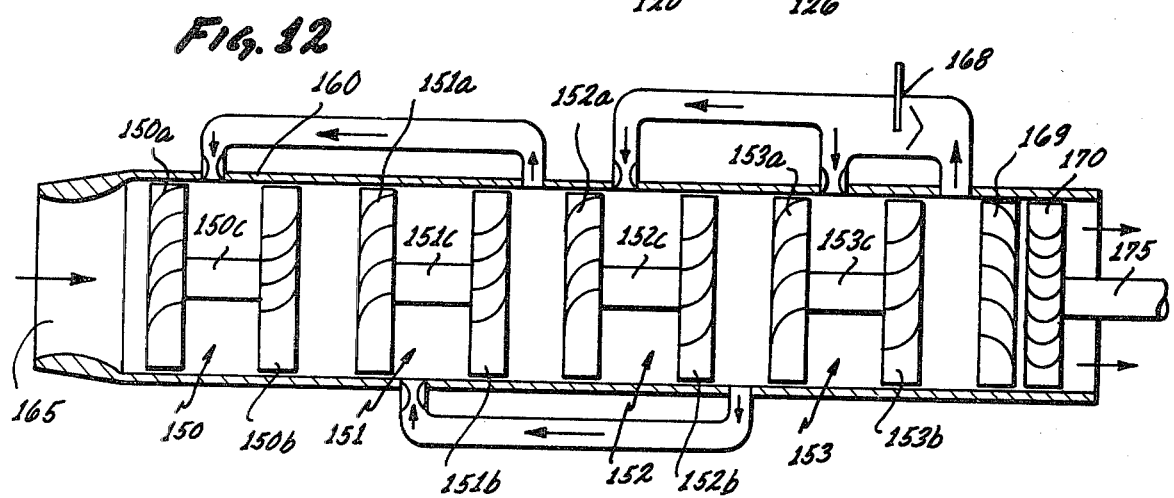
FIG. 12 is a view similar to FIG. 11 of a multistage device using the TCE device of the present invention.

The device of FIG. 11 may be modified to provide a multistaged engine as shown diagrammatically in FIG. 12. Here a plurality of TCE devices 150-153 are shown each including a compressor 150a -153a and a turbine 150b-153b each pair on a separate shaft 150c-153c, and each device being supported in axial alignment in a housing 160.

Fluid enters at 165 at low pressure and flows through each of the stages 150, 151, 152, and 153. A portion of the output of stage 151 is used as the high pressure source for stage 150 while a portion of the output of stage 152 is used as a high pressure source for stage 151. A portion of the output of the last stage 153 is used for the last stage 153 and the preceeding stage 152. A full inlet and power source is provided in the inlet to the last two stages by burner 168. The output from the last stage 153, has a substantially increased pressure over the pressure of the incoming fluid 165 and is directed to power a power turbine by stator 169 which powers a power turbine 170 having a shaft 175 mounted thereto.

Figure 13:
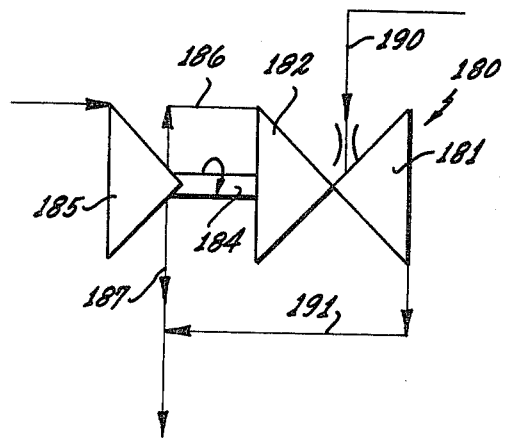
FIG. 13 is a schematic diagram of the TCE device of this invention used in a compression system.

The TCE device of this invention may also be used where a relatively low pressure ratio is required while a high-energy low flow driving stream is available. Referring to FIG. 13, a TCE device 180, shown diagrammatically includes a turbine wheel 181 mounted for rotation with a compressor wheel 182 the latter connected by a shaft or other coupling 184 to a compressor 185. Here the TCE device 180 is used to power the compressor 185.

Typical of such installations are those in which a relatively large primary mass flow which requires only a moderate pressure rise is needed. As shown, a conventional single stage compressor unit is used in which a small portion of the output 186 is bypassed to the compressor of the TCE 180. The majority of the output 187 of the compressor 185 is the system output.

The flow from the bypass line 186 enters the inlet of the compressor portion 182 of the TCE device 180 and this flow is accelerated to the desired velocity so that no or little mixing losses will occur when the fluid is mixed with the driving fluid entering at 190. The combined stream is then expanded through the turbine 181 of the TCE device 180 affording an excess amount of power which is used to drive the compressor 185 driven by shaft 184 connected to compressor 182 also driven with the turbine stage 181 of the TCE. The exhausting fluid 191 from turbine stage 181 can be expanded down to the desired system output pressure level and if desired, combined with the output 187 of compressor 185 to provide the desired system flow and pressure level, all obtained with the efficient no-loss mixing effect achieved by the TCE device of this invention.

As pointed out previously, one of the salient features of the present invention is that it enables turbomachinery to be used in relatively low capacity applications, where the efficiency of the unit is relatively high, even at relatively low Reynold's Numbers. Further, due to this high efficiency, the device of this invention enables the design of systems which heretofore could not be provided economically due to the low efficiency of the conventional type of systems.

As will be understood, the overall efficiency of the devices described is especially attractive where the cycle working fluid is used as a bearing lubrication system. Thus, in heat powered air conditioning systems, gas lubricated bearings may be used which substantially eliminates contamination problems associated with the heat exchange of the cycle as well as permitting optimum speeds to obtain the highest possible efficiencies for the rotating components. Typical of the gas lubricated bearings which may be used are those of my U.S. Pat. Nos. 3,249,390; 3,476,451, and 3,656,822, although other units may be used.

The other source of efficiency of operation is the fact that the device of the present invention has fewer components than standard turbines, compressors, and turbocompressor combinations so that the frictional losses and aerodynamic losses are less, as already described.

By way of example and based on the use of incompressible fluids, ejector analysis indicates an efficiency, as a function of velocity ratios and mass flow ratios as shown in the following table:

| | Ejector Efficiency ($\eta$) As Function of Velocity Ratio and Mass Flow Ratio | | | | | | | |
|---|---|---|---|---|---|---|---|---|
| M | ½ | 1 | 2 | 5 | 7 | 10 | 15 | 20 |
| V | | | | | | | | |
| 0 | .670 | .50 | .333 | .167 | .125 | .091 | .0625 | .0476 |
| .1 | .7313 | .599 | .4705 | .3571 | .3376 | .3305 | .3396 | .3571 |
| .2 | .791 | .692 | .605 | .555 | .5624 | .584 | .625 | .6613 |
| .3 | .8437 | .7752 | .723 | .718 | .737 | .765 | .8045 | .8333 |
| .4 | .888 | .845 | .8181 | .8333 | .8514 | .8740 | .9007 | .9183 |
| .5 | .926 | .900 | .888 | .9074 | .920 | .935 | .9506 | .9603 |
| .6 | .955 | .9411 | .9380 | .9523 | .9602 | .968 | .9765 | .9814 |
| .7 | .976 | .9697 | .9696 | .9782 | .9822 | .9861 | .9898 | .992 |
| .8 | .989 | .9878 | .9883 | .992 | .9936 | .9950 | .9964 | .9972 |
| .9 | .997 | .9972 | .9974 | .9983 | .9886 | .999 | .9992 | .9994 |
| 1.0 | 1.00 | 1.00 | 1.00 | 1.00 | 1.00 | 1.00 | 1.00 | 1.00 |
| 2.0 | .888 | .900 | .926 | .9603 | .9698 | .9778 | .9846 | .9882 |
| 5.0 | .605 | .692 | .7908 | .8941 | .9204 | .942 | .9601 | .9695 |

Where $M = \dfrac{\text{Mass flow through compressor wheel}}{\text{Mass flow through ejector}}$ $V = \dfrac{\text{Vel. of fluid leaving tip of the wheel}}{\text{Vel. of fluid exiting from ejector}}$ The velocity ratio V is the velocity of the fluid leaving the compressor wheel tip divided by the velocity of the fluid entering from the ejector (high pressure source fluid) at the point of mixing with the fluid leaving the compressor wheel tip. As a practical matter, the velocity of the fluid coming from the ejector is higher than the velocity of the fluid leaving the compressor wheel tip by perhaps up to 25% to make up for any friction losses, depending upon the specific design and fluid.

The mass ratio M is the mass flow through the compressor wheel divided by the mass flow through the ejector. The efficiency is defined as the ratio of the energy out of the device divided by sum of the energies in. The sum of the energy in is the sum of the energy of the input fluid and the energy of the fluid entering the ejector. The output energy is that of the output fluid exiting from the device. Accordingly, for a velocity ratio of 0.7 and mass ratio of 2, the efficiency is 0.9696, as shown in the table.

The fluids may be the same or different, i.e. a gas as the inlet and power fluid or a gas as the power fluid with a liquid as the fluid being pumped.

It will be apparent to those skilled in the art that the device of this invention is unique and because of the relatively high efficiency thereof compared to turbines, compressors, ejectors, and combinations thereof as separate units, that various systems heretofore unattractive because of low efficiency may now be designed with higher efficiency. Accordingly, it will be apparent to those skilled in the art, from the foregoing description of various forms of the invention, that modifications may be made in the form, construction and arrangements of the parts and systems without departing from the spirit and scope of the invention as defined in the following claims.

I claim:

1. In a system for use with a fluid at one energy level and a fluid at a higher energy level, an improved turbine-compressor-ejector turbomachine device for increasing the pressure of the fluid of said one energy level by an energy exchange with the energy of the fluid of the higher energy level comprising:

means forming a source of fluid at said higher energy level, means forming a housing, a compressor and turbine positioned in said housing, said turbine and compressor being interconnected in said housing for rotation together, bearing means supported within said housing for rotatingly supporting said compressor and turbine, said housing including an inlet for flow therethrough of the fluid at said one energy level, said compressor being mounted in said housing for receiving flow of the fluid at said one energy level for flow thereof through the compressor, said housing including an ejector inlet opening connected to receive flow therethrough of fluid at the higher energy level to effect increase in the mass flow through said turbine as compared to the mass flow through said compressor, said turbine being mounted in said housing for rotation with said compressor and receiving flow of all of the fluid from said compressor and all of the fluid from said ejector inlet opening, means in said housing forming an outlet for discharging the fluid leaving said turbine, and means in said housing forming a mixing region free of combustion between said fluids to receive flow of fluid from said compressor and from said ejector inlet opening to effect an increase in the total energy of the fluid from said compressor by admixing the fluid flow from said compressor with the fluid flowing through said ejector inlet opening.

2. In a system as set forth in claim 1 wherein each of said compressor and turbine of the turbine-compressor-ejector turbomachine device are of the radial flow type and mounted on a common shaft, said shaft being mounted on said bearing means, and said turbine being mounted on the rear face of said compressor.

3. In a system as set forth in claim 1 wherein each of said turbine and compressor of the turbine-ejector-compressor turbomachine device are of the axial type, said turbine and compressor being mounted on a spindle, a shaft means supported in said housing, and said spindle being mounted on said shaft by said bearings.

4. In a system as set forth in claim 1 wherein guide vanes are supported in said housing to direct flow of fluid into said turbine.

5. In a system as set forth in claim 1 wherein said housing includes means forming an expansion chamber for the fluid entering from said ejector inlet opening.

6. In a system as set forth in claim 1 wherein said ejector inlet opening includes at least one inlet nozzle.

7. In a system as set forth in claim 1 wherein said ejector inlet opening includes a plurality of inlet nozzles.

8. In a system as set forth in claim 1 including means interconnecting the outlet of said turbine and said ejector inlet opening such that a portion of the outlet of said turbine is used as fluid for said ejector inlet opening, and means to add energy to the portion of the fluid flowing from said outlet to said ejector inlet opening.

9. In combination with a fluid of one energy level and a fluid of a higher energy level, an improved device for increasing the energy of the fluid of said one energy level by the use of the fluid at the higher energy level comprising:

a housing having a compressor and a turbine wheel mounted therein for rotation, shaft means interconnecting said compressor and said turbine wheel to drive the compressor to increase the tangential velocity of the fluid leaving the compressor, the increase being a direct function of the speed of the compressor, fluid inlet means in said housing for entrance of one of said fluids for flow to said compressor, discharge means in said housing for flow of fluid from said turbine, ejector means forming an inlet in said housing for flow of the other of said fluid, said ejector means being so located and positioned within said housing as to effect flow of fluid from said ejector means in the same tangential direction as the tangential direction of fluid from said compressor, housing means forming a mixing chamber in said housing receiving the fluid from said ejector and the fluid from said compressor and to effect energy exchange between the two fluids by a momentum exchange and to provide a flow of mixed fluid therethrough whose mass flow is greater than the mass flow through each of said compressor and ejector means, respectively, and means for flowing said fluid of increased mass flow from said mixing chamber to said turbine to drive the same.

10. The combination as set forth in claim 9 wherein said turbine is integral with said compressor.

11. The combination as set forth in claim 9 wherein said ejector means is positioned between the turbine and compressor so that the fluid flowing therethrough is expanded such that the jet velocity ($V_j$) thereof approaches the tangential velocity of the fluid leaving the compressor wheel.

12. The combination as set forth in claim 11 wherein each of said compressor and turbine is of the axial flow type.

13. The combination as set forth in claim 11 wherein said ejector means included a plurality of nozzles supported in said housing and positioned to direct flow of the fluid for admixture with the fluid from said compressor.

14. The combination as set forth in claim 9 wherein said housing supports a plurality of compressor-turbine wheels in spaced axial alignment.

15. The combination as set forth in claim 9 wherein said housing supports a power turbine stator spaced from said turbine wheel, and power turbine means associated with said power turbine stator to receive flow therefrom.

16. The combination as set forth in claim 9 for powering a separate compressor when the fluid of said one energy level enters said compressor further including:

a separate compressor, said compressor being mounted to drive said separate compressor, means to flow a portion of the output of said separate compressor, means to flow a portion of the output of said separate compressor into said compressor, and means to flow the output of said turbine into the remaining output flow of said separate compressor.

17. A turbine-compressor-ejector turbomachine comprising:

a housing and a compressor and turbine positioned in said housing, said turbine and compressor being interconnected in said housing for rotation together, bearing means supported within said housing for rotatably supporting said compressor and said turbine, said housing including an inlet port communicating with said compressor for flow of fluid through said compressor whereby a tangential velocity is imparted to said fluid as it flows through said compressor, ejector means located within said housing, said housing including ejector inlet nozzle means for flow of fluid to said ejector means, said ejector means being so located and positioned within said housing as to effect flow of fluid from said ejector in the same tangential direction as the tangential direction of fluid from said compressor, means within said housing forming a mixing region located to receive flow of fluid from said compressor and from said ejector means to effect intermixing thereof free of combustion, said turbine being positioned to receive flow of fluid from said mixing region, and means in said housing forming an outlet for fluid flowing through said turbine.

18. The method of increasing the pressure of fluid at one energy level by an energy exchange with a fluid at a higher energy level by flowing said fluids through a turbo-machine including a compressor driven by a turbine and wherein there is a mixing region therebetween which includes an ejector cooperating with said mixing region and compressor and turbine comprising the steps of:

flowing the fluid at one energy level into said compressor for flow through said compressor into said mixing region, flowing said fluid at said higher energy level through said ejector and into said mixing region to effect an energy exchange between the two fluids by a momentum exchange and to provide a flow of mixed fluids whose energy is greater than the energy flowing through said compressor, flowing said mixed fluids through said turbine to drive said turbine and to provide an output fluid whose pressure is greater than the pressure of the fluid at said one energy level, and the volume flow of the fluid of said one energy level exceeding the volume flow of the fluid at said higher energy level.

19. The method of claim 18 wherein each said fluid is a gas.

20. The method of claim 18 wherein at least one of said fluids is a mixture of gases.

21. The method of claim 18 wherein each said fluid is a liquid.

22. The method of claim 18 wherein at least one of said fluids is a mixture of liquids.

23. The method as set forth in claim 18 wherein the mass flow of said mixed fluids is greater than the mass flow of the fluids through each of said compressor and ejector, respectively.

* * * * *